June 13, 1933.     M. BALDEWEG     1,913,912
ROLL FILM BOX CAMERA
Filed Dec. 16, 1931
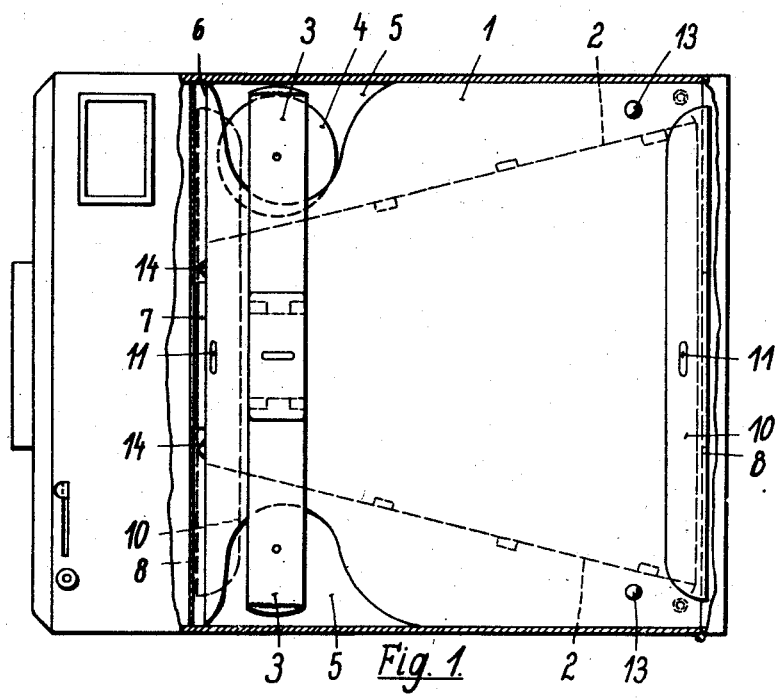
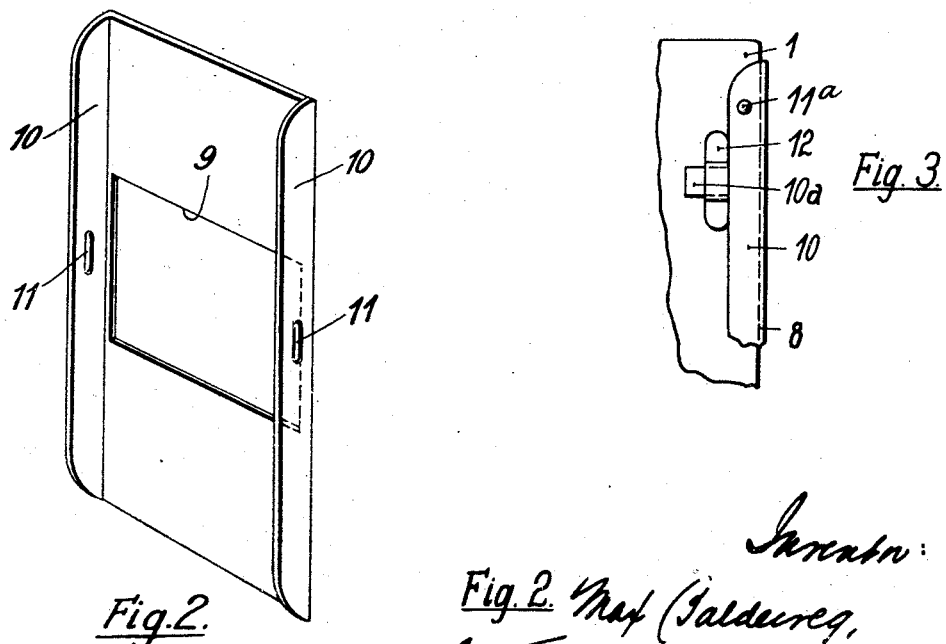

Patented June 13, 1933

1,913,912

UNITED STATES PATENT OFFICE

MAX BALDEWEG, OF DRESDEN, GERMANY

ROLL-FILM BOX CAMERA

Application filed December 16, 1931, Serial No. 581,435, and in Germany December 24, 1930.

I have filed applications in Germany Dec. 24, 1930 and England Nov. 21, 1931.

The invention relates to roll-film box cameras having a box element removable from the casing for the purpose of film changing and in some cases carrying the rear lens and extending forwards up to the objective wall of the outer shell, and which receives the film spool supports in indentations near its front wall.

Roll film cameras are already known in which about twice the exposures can be accommodated on a normal film. It was indeed also a roll-film box camera, but was of different construction and only answered this purpose and therefore does not permit the production of larger pictures. On journeys it is however desirable to have both possibilities. According to the invention on or in the picture area side of the insertion box of the above-mentioned ordinary roll-film box camera is slid a removable plate with a picture area of about one half or one third the height of the normal picture area and the front wall of the insertion box is kept at such a distance from the front wall of the camera casing that the removable picture area wall can be stored there when not in use. For the purpose of more securely fastening this removable picture area wall at right angles to its plane are bent lug-shaped extensions which clasp the longitudinal walls of the insertion box. Although not necessary, it is nevertheless advantageous to allow the side walls of the insertion box to extend at the front side at such distance from each other that the picture area wall with its extensions also clasps them. Thus any rattle is with certainty prevented. Both the side walls and the lug-shaped extensions of the picture area wall can be provided with projections and rests which sufficiently secure the picture area wall in its position relative to the insertion box. This action can be increased further if, instead of the right-angle walls on the picture area carrier, lugs of sufficient breadth are arranged, and guides for their reception are formed on the side walls of the insertion box by strips mounted thereon. If this device is provided near the rests or projections, both are thus the more firmly held in engagement. These mounted strips at the same time take over the task of compensating for the play between insertion box and camera casing, especially if they are bent a little outwards so that they act yieldingly. Instead thereof however both on the back side of the insertion element as well as on the front side of the same projections or grooves can be stamped outwards, which in the latter case preferably lie within the picture area, as apparent from the drawing annexed.

In the drawing a constructional example of the invention is illustrated. Fig. 1 shows a side view of the insertion element of a roll-film box camera with a picture area wall slid thereon, Fig. 2 is a view in perspective of a picture area wall slide; and Fig. 3 shows a modification of the fastening device.

The side walls of the insertion box of the camera not otherwise illustrated are designated 1. They carry the inclined walls 2 as well as the film spool supports 3 which hold the film spools 4 in bulges 5. At the front of the end wall 6 there is usually also a rear lens 7. The picture area wall 8 with the picture area 9 has side rectangularly bent laps 10 which may extend over the whole length of the wall 8, but can naturally also be shorter. To secure the wall 8, which is illustrated in Fig. 1 in full thick lines in the position for use and in dotted illustration on the front wall of the insertion box, projections or rests 11a may be provided. To increase the securing action of these securing means the laps 10 of the picture area wall may carry extensions 10a for the reception of which serve strips 12 or the like which likewise form sockets. The carrying out of the invention is also independent of such details. If these strips 12 are correspondingly shaped at their bend, they may be given springy properties and act to hold the insertion element to prevent rattle. Instead of this, however, projections 13 can also be provided as well as similar ones 14 on the front sides 6 of the insertion element, which lie so that they are situated within the picture area 9 if the picture area wall 8 is slid on there.

Having now particularly described and ascertained the nature of my said invention and in what manner the same is to be performed, I declare that what I claim is:

1. In a roll film box camera, the combination of a box-like insertion element forming a film roll carrier, of a plurality of mask plates, and coacting means on said mask plates and the front and rear of the insertion element for securing the mask plates selectively on the front and rear of the insertion element.

2. In a roll film box camera, the combination of a box-like insertion member having parallel side walls, of a plurality of mask plates, and flanges on the side edges of the mask plates adapted to frictionally grip the side walls at the front and rear ends of said insertion member whereby the mask plates may be selectively interchanged between said front and rear ends.

3. In a roll film box camera, the combination of a box-like insertion member having parallel side walls, of a plurality of mask plates, flanges on the side edges of the mask plates adapted to frictionally grip the side walls at the front and rear ends of said insertion member whereby the mask plates may be selectively interchanged between said front and rear ends, and interfitting lugs and sockets on said flanges and side walls to hold said mask plates in proper position on the insertion element.

4. In a roll film box camera, the combination of a box-like insertion member having parallel side walls, of a plurality of mask plates, and flanges on the side edges of the mask plates adapted to frictionally grip the side walls at the front and rear ends of said insertion member whereby the mask plates may be selectively interchanged between said front and rear ends, said flanges having lugs extending inwardly from their inner faces and the side walls having depressions constituting sockets to receive the said lugs.

5. In a roll film box camera, the combination of a box-like insertion member having parallel side walls, of a plurality of mask plates, flanges on the side edges of the mask plates adapted to frictionally grip the side walls at the front and rear ends of said insertion member whereby the mask plates may be selectively interchanged between said front and rear ends, lugs extending from the edges of said flanges to lie along said side walls, and strips secured to said side walls and bridging said lugs to form sockets therefor.

MAX BALDEWEG.